Patented Apr. 30, 1929.  1,710,922

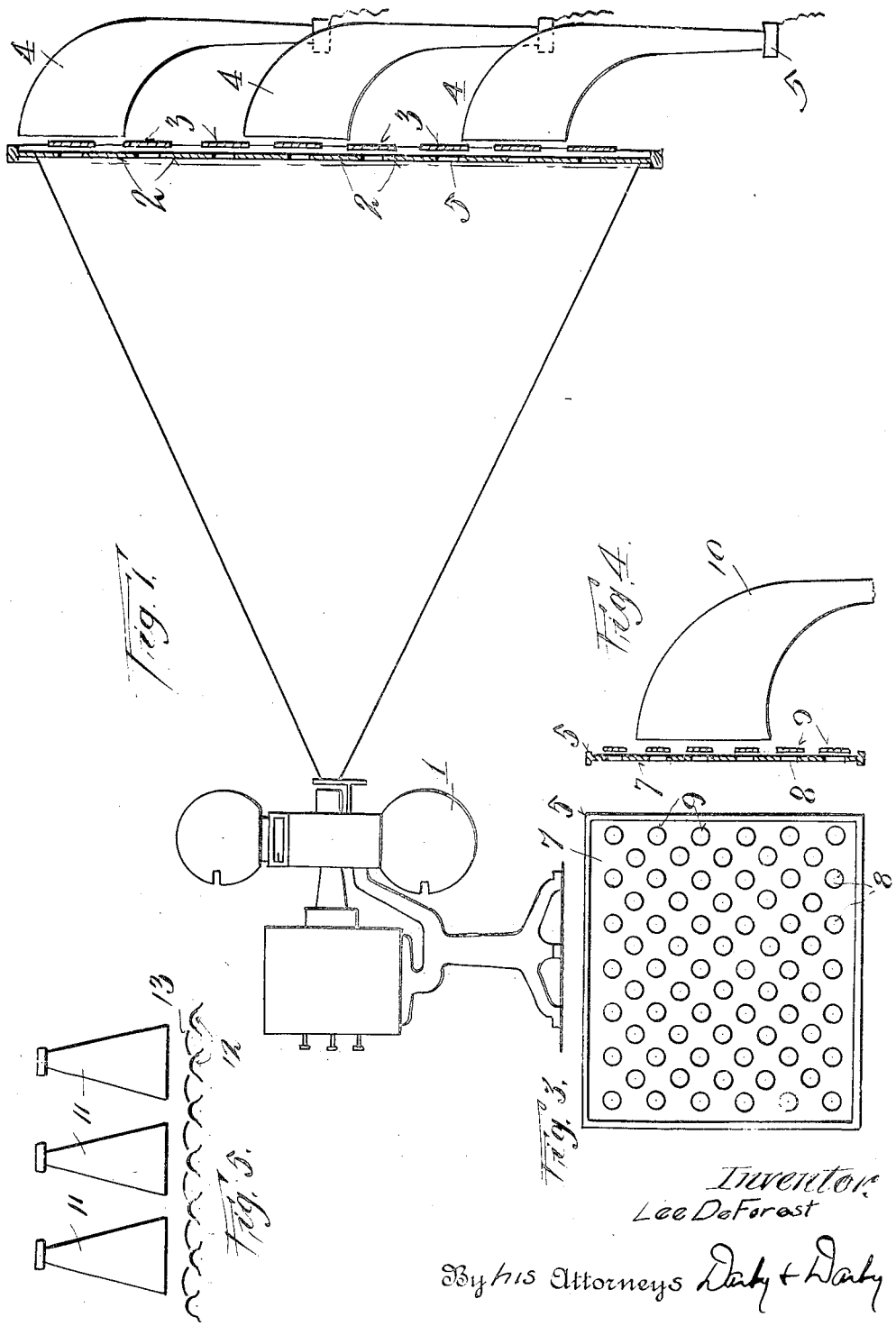

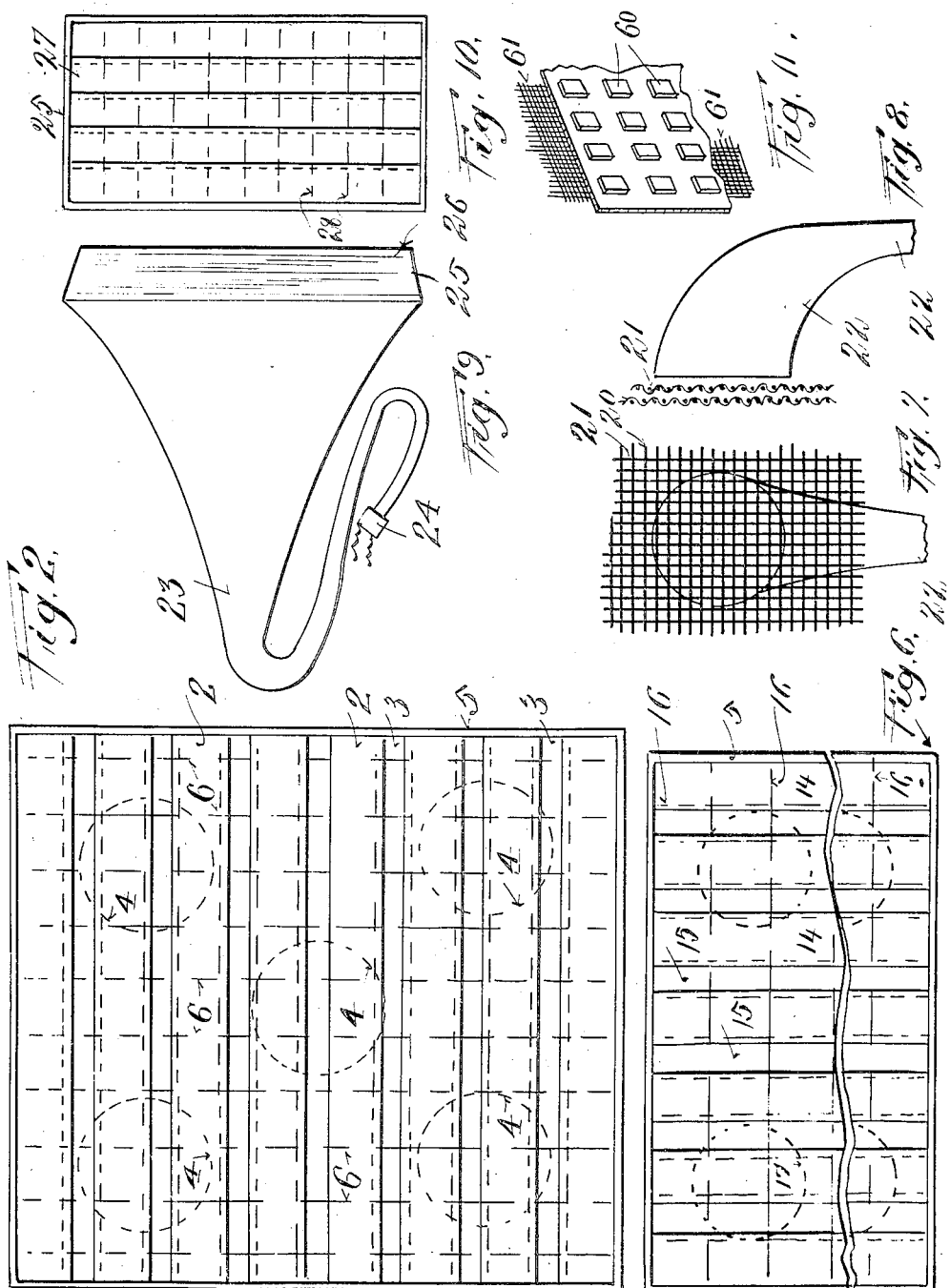

UNITED STATES PATENT OFFICE.

LEE DE FOREST, OF NEW YORK, N. Y., ASSIGNOR BY MESNE ASSIGNMENTS, TO GENERAL TALKING PICTURES CORPORATION, A CORPORATION OF DELAWARE.

MOTION-PICTURE SCREEN.

Application filed November 27, 1926. Serial No. 151,169.

This invention relates boardly to improved screens and combination of screens with loud speaking devices for use in talking motion pictures.

One of the objects of this invention is to produce a new and novel type of construction for motion picture screens, particularly adapted for use in connection with the talking motion pictures.

Another object of this invention is the combination of a novel form of screen with a sound producing device or with a plurality of sound producing devices arranged to produce the effect of having the sound emerge from the screen.

A further object of this invention is the provision of a novel form of motion picture screen which is opaque to light waves and yet one that is highly transparent to sound waves.

A still further object of this invention is the construction of a motion picture screen comprised of a plurality of sets of elements arranged in separate parallel planes to provide a virtually continuous screen which is highly reflecting to light and readily transmits sound therethrough.

A still further object of this invention is the construction of a screen of the above type comprising a set of elements to form a screen surface which is interrupted at a plurality of points and a secondary series of elements lying in a plane in back of the first surface and overlapping the interrupted portions of the front surface to provide in effect with respect to light reflection, a substantially uniform surface.

A still further object of this invention is to locate with respect to screens of this type, one or a plurality of sound reproducing devices in back thereof so that the sound waves therefrom will be transmitted through the screen to produce the effect of sound coming directly from the screen.

These and many other objects as will become apparent in the following description are secured by the construction and arrangement of my invention.

This invention resides substantially in the combination, construction, arrangement and relative location of the several parts forming my novel combinations as will appear from the following disclosure.

Referring to the drawings where the reference numerals will be used in the several views to indicate the same or similar parts,—

Figure 1 is a side elevational view of one form of my invention showing the screen in vertical cross-section.

Fig. 2 is a front elevational view of the construction of a screen of the type shown in Fig. 1 disclosing the disposition of the sound reproducing devices with respect thereto.

Fig. 3 is a front elevational view in a modified form of screen.

Fig. 4 is a side elevational view showing this modified form of screen in vertical cross-section.

Fig. 5 is a diagrammatic view disclosing the relative arrangement of the parts comprising a still further modified form of screen.

Fig. 6 discloses a construction similar to that of Fig. 2 in which the reflecting strips are disposed vertically in the supporting frame.

Fig. 7 discloses a still further modified form of screen which is constructed in the form of a netting.

Fig. 8 is a side elevational view of the construction of Fig. 7.

Fig. 9 is a perspective view of a large sound reproducing device provided with a continuous screen mounted in the mouth of the loud speaking horn, and;

Fig. 10 is a front elevational view of the same type of horn provided with a screen in its mouth composed of a number of over-lapping strips.

Fig. 11 shows a modified form of this metallic screen mounted on a wire mesh.

My invention relates to improvements in motion picture screens, especially designed for use in the showing of talking motion pictures. It has been appreciated for some time that to secure a maximum realism in talking motion pictures, it is highly desirable that the sound emitting devices, such as loud speaker horns, be located directly in back of the picture screen. However, a screen, which is a good and efficient reflector, such as has been formerly found advantageous to employ in large theatres is necessarily thick and opaque to sound waves so that it is impractical to arrange sound producing devices in back of such screens, making it necessary to locate them as near as possible to the screen; either above, below or to the sides thereof in order to nearly as possible associate the source of sound with the picture on the screen.

As will be apparent from my following description, I have devised a number of types of motion picture screens in which the highly desirable functions of complete opacity and high reflective qualities for light waves and free transparency to sound waves are combined.

Referring then to the drawings I have shown one form of screen in Figs. 1 and 2 which disclose at 1, one form of projecting machine adapted to project a picture on the screen and at the same time convert the sound record on the film to electrical current variations adapted to operate loud speaking devices. The screen itself is composed of a frame 5 which may be of any suitable construction in which is mounted in a single plane, a plurality of horizontally extending but vertically separated bands of opaque material suitable for screen reflecting surfaces. Lying in a plane and disposed in back of the surface formed by the strips 2 are a plurality of horizontally extending but vertically separated strips 3 of suitable screen material disposed in alignment with the spaces between the strips 2 and overlapping the edges of these strips. It will be noticed in Fig. 2 that a plurality of wires or narrow strips indicated at 6 are used for supporting the separate bands composing the screen. These wires 6 can be cemented or welded, or otherwise attached to the separate bands at a number of points to provide a unitary structure. Suitably mounted in back of the screen in any desirable spacial relation are a plurality of sound reproducing devices having the horn 4 and the electro-magnetic actuating units 5. No further disclosure is made of these devices since it is evident that they may assume any of the well-known forms in the art. By means of this complete assemblage of elements a screen is produced which, when viewed from a distance, appears to have a continuous surface, at least, in so far as its light reflecting qualities are involved and is, at the same time, by virtue of its small spaces between the two sets of strips adapted to freely transmit the sound therethrough from the sound devices. The construction disclosed in the Fig. 6 is quite similar to the construction of Figs. 1 and 2 with the exception that the front strips 14, which are supported in the frame 5, are arranged vertically and the strips 15 in back thereof and overlapping the spaces between the front strips, also extend vertically. These two sets of strips are as before strengthened and supported by the wires or narrow bands 16 strung from side to side and top to bottom of the frame 5. Sound reproducing devices 17 are indicated by the dotted surface as being disposed in back of the screen. It will be evident that the strip or bands comprising the screen surfaces in these two modifications are drawn taut and firmly secured to the frame 5 to afford perfectly rigid assemblage.

In order to avoid a series of parallel shadows to one looking at such a screen from an angle, it is obvious that the distance between the front and rear sets of strips of the screen must be very small. To secure this desirable result I have found it preferable to employ for the two sets of screen strips very thin metal, such as aluminum foil of from five to ten one thousandths (5/1000 to 10/1000) of an inch thick and in the preferred form, the vertically and horizontally extending wires or narrow ribbons should be also constructed of aluminum attached to the bands at a plurality of points. It will be noted that these wires, ribbons or narrow strips for supporting the screen surface have not been shown in the cross-sectional view of Fig. 1 in order that the small space between the two sets of bands may be more clearly disclosed. It will be evident however, that these supporting wires may be secured to the band in any suitable and desirable manner. The screen surface forming strips may be painted or enamelled, or left in their natural color of aluminum, preferably pitted or stippled so as to afford the most suitable surface for reflecting the light waves which form the picture.

Referring to Fig. 3 the modified form of screen is shown in which there is utilized as before, a suitable frame 5 for supporting the front screen surface 7 which, in this form, is provided with a plurality of regularly disposed circular openings 8. Disposed in back of the surface 7 are a plurality of disks 9 somewhat larger than the holes 8 arranged in alignment therewith to give the screen an appearance of continuity when viewed at a distance. The disks 9 are supported as before by means of wires or bands which may be secured to the frame 5 and are arranged so as to be separated from the front screen 7 by a very short distance. It will be evident that the openings 8 may be of any desirable configuration since the purpose thereof, is to provide a free passage for the sound waves from the sound producing devices 10 mounted in back of the screen. In this form of construction the front screen 7 may be composed of a flat sheet of suitable fabric or even thin metal such as aluminum, or any suitable opaque material which may or may not be painted as found desirable.

In Fig. 5 is shown a variation of this arrangement in which the front set of elements forming the screen may consist of a series of shallow cups 12 suitably supported on wires or bands or in any efficient manner. The spaces between these cups are covered by means of a series of circular cup surfaces 13. These cups are staggered with respect to the cups forming the front row of elements to provide a screen which when viewed from a distance, appears to be a continuous surface. The two series of shallow cup surfaces are only placed sufficiently far apart to provide ample space therebetween to permit the free egress of sound from the loud speaking devices 11 mounted in back of the screen. I have not here shown any method for assembling the two series of small cup surfaces but I prefer to use cup surfaces of metal, that is, thin aluminum and have these mounted on a net work of vertical and horizontal wires in the rear of the screen as will be readily apparent from the teachings of the previous disclosures. The concave surfaces are either painted white or left in their natural state, that is, roughened aluminum.

The arrangement disclosed in Figs. 7 and 8 comprises a screen made up of two independent surfaces of wire netting 20 and 21 of very fine mesh disposed parallel to each other as shown in Fig. 8 and vertically and horizontally displaced with respect to each other so that the wires of the rear screen will appear to lie between the wires of the front screen. When screens of sufficiently fine mesh are so arranged it will be apparent that they will provide a substantially continuous light reflecting surface which is readily adapted for the passage of sound waves therethrough. As before, a loud speaking device or devices may be mounted in back of the screen as shown in Fig. 8. The two wire screens may be painted white if this is found desirable. By this staggered arrangement of one screen with respect to the other, it will be apparent that the wires of the rear screen 21 may be seen through interstices in the netting of the front screen. The arrangement in Fig. 9 comprises a large horn 23 constructed so that its cross-sectional area enlarges towards the large end according to the logarithmic law of expansion. An electro-magnetic sound reproducing device 24 is applied to the smaller end of the horn as is well-known in the art. The large bell end of the horn indicated at 25 is covered with a tightly stretched opaque material of a very thin cross-section to provide a screen for the light waves. I have found that this curtain extending across the mouth of the horn may best be made up of a thin sheet of aluminum foil of the order of 0.0003 inch in thickness. I have found that an aluminum curtain of this construction, while being absolutely opaque to light and forming an excellent reflector for motion pictures, particularly when the surface is stippled, roughened or slightly corrugated, affords very little obstruction to the sound waves emerging from the horn. In other words, this thin aluminum sheet is absolutely opaque to light and at the same time, efficiently transparent to sound.

I have shown in the construction of Fig. 10 in which a logarithmic horn, just like that employed in the construction of Fig. 9, is provided in its aperture with a series of vertically extending strips of suitable material 27.

These strips over lap each other slightly as shown by the vertically dotted lines and are disposed at a slight angle to the frame formed by the mouth of the horn like the slats of a Venetian blind. This construction presents a substantially smooth surface when viewed at a distance and yet provides a series of long, narrow crevices through which the sound may readily emerge from the horn. As before, these strips may be supported and strengthened by means of the horizontally extending wires 28 secured to the horn body and attached in a suitable manner to the strips at a plurality of points.

I have found that a very effective form of motion picture screen practically transparent to sound and perfectly opaque to light is obtained by the employment of the aforementioned very thin aluminum foil preferably less than .001 inch in thickness, the same being mounted against a fairly coarse wire mesh screen, similar to a wire window screen, the aluminum foil being cemented at all points to the wire mesh so as to prevent rattling or rustling when the sound waves strike the foil. The screen mesh is preferably placed on the rear side of the aluminum foil.

Instead of using the aluminum foil in flat or plain form, I prefer to corrugate or cross-hatch it so that the surface is formed of a multiplicity of squares or cells 61, Fig. 11 in relief. These being of the order of 1/16 inch square and with valleys in between said squares of the order of 1/32 inch in depth. This screen is suitably secured to the supporting mesh 61.

Such a screen of aluminum foil as I have just described may be used in combination with one or more loud-speaker units, the same as shown in Figure 2. It is not necessary that this thin aluminum foil screen be placed in the aperture of a single very large horn as shown at Figure 9.

It will be evident from the foregoing disclosures that I have devised a plurality of forms of screens for use in the showing of talking motion pictures which is completely opaque to light waves and freely transparent to sound waves while yet presenting a substantially uniform and continued surface when viewed from a point directly in front of the screen or at an angle thereto.

I am, of course, aware that many changes and modifications may be made in the details of construction and relative arrangement of parts to produce devices which are readily adapted for the purposes of my invention and I do not desire therefore to be particularly limited to the disclosed constructions recited above for the purposes of illustration but rather to the claims which are appended below, as embodying my invention.

What I seek to secure by United States Letters Patent is:

1. In a construction of the type described, the combination with a motion picture screen, comprising a plurality of separated bands of opaque material lying in a plane and a plurality of bands of similar material lying in a plane in back of said first plane and arranged in alignment with the spaces formed by said separated bands said bands having light reflecting surfaces of means for producing sound mounted in back of said screen so that the sound waves from said means will be transmitted through said screen.

2. A motion picture screen composed of two separate sets of parallel spaced elements each forming a non-continuous light reflecting surface, the sets being disposed so as to provide a surface opaque to light and transparent to sound.

3. A motion picture screen comprising a plurality of sets of light reflecting elements having interrupted surfaces said sets being disposed with respect to each other to afford a virtually plane surface opaque to light.

4. In a motion picture screen, the combination of two sets of non-continuous light reflecting elements having one set slightly in back of the other and out of alignment with each other.

5. In a motion picture screen, the combination of a frame of a plurality of separated strips supported on said frame and plurality of strips mounted in back of the spaces formed by said first strips and secured to said frame all of said strips having light reflecting surfaces.

6. In a motion picture screen, the combination of a frame of a plurality of separated strips supported on said frame and plurality of strips mounted in back of the spaces formed by said first strips and means for attaching and supporting said strips on said frame all of said strips having light reflecting surfaces.

7. In a motion picture screen, the combination comprising two sets of parallel spaced elements having light reflecting surfaces and sound reproducing devices said screen being opaque to light and transparent to sound and arranged between a source of light and the sound devices.

8. A motion picture screen comprising two sets of separated parallel metallic strips having light reflecting surfaces, opaque to light and transparent to sound.

9. In a motion picture screen the combination with a frame of sets of exceedingly, thin, separated, metallic strips arranged in parallel planes, the strips of one set over-lapping the strips of another set, but out of contact therewith, said screen being opaque to light and transparent to sound.

10. In a motion picture screen the combination with a frame of two sets of spaced strips, one set lying in back of the other set and having its strips over-lapping the strips of said other set, and means for supporting each set of strips on said frame, said screen presenting a virtually uniform reflecting surface, transparent to sound.

11. In a motion picture screen the combination with a frame of two sets of spaced, thin metallic strips, one set lying in back of the other set and having its strips overlapping the strips of said other set, and means for supporting each set of strips on said frame, said screen presenting a virtually uniform reflecting surface transparent to sound.

12. A light reflecting and sound transmitting motion picture screen comprising at least two spaced parallel layers each composed of a series of separated elements, the elements of one layer being out of alignment with the elements of the other layer to give the appearance, when viewed at a distance, of a continuous surface and to permit ready passage of sound therethrough.

In testimony whereof I have hereunto set my hand on this 18th day of Nov., A. D., 1926.

LEE DE FOREST.